United States Patent
Eastham et al.

[11] Patent Number: 6,131,614
[45] Date of Patent: Oct. 17, 2000

[54] CONVOLUTED PROTECTIVE HOSE

[75] Inventors: David Raymond Eastham, Hemel Hempstead; Mark Andrew Poole, Rugby, both of United Kingdom; Anthony Salvatore Laskey, Pleasant Shade, Tenn.

[73] Assignee: T&N Technology Limited, Rugby, United Kingdom

[21] Appl. No.: 09/142,570

[22] PCT Filed: Mar. 7, 1997

[86] PCT No.: PCT/GB97/00640

§ 371 Date: Apr. 12, 1999

§ 102(e) Date: Apr. 12, 1999

[87] PCT Pub. No.: WO97/35134

PCT Pub. Date: Sep. 25, 1997

[30] Foreign Application Priority Data

Mar. 15, 1996 [GB] United Kingdom ................. 9605489

[51] Int. Cl.⁷ ............................................. F16L 11/11
[52] U.S. Cl. ........................ 138/110; 138/121; 138/122; 138/137; 138/143; 138/146
[58] Field of Search .................... 138/110, 121, 138/122, 137, 138, 143, 146

[56] References Cited

U.S. PATENT DOCUMENTS

| | | | |
|---|---|---|---|
| 2,858,854 | 11/1958 | Daggett | 138/56 |
| 3,537,886 | 11/1970 | Rively et al. | 117/107 |
| 3,640,832 | 2/1972 | Kurz | 161/160 |
| 4,022,248 | 5/1977 | Hepner et al. | 138/141 |
| 4,772,507 | 9/1988 | Leo, Jr. et al. | 428/218 |
| 4,842,908 | 6/1989 | Cohen et al. | 428/34.2 |
| 4,900,383 | 2/1990 | Dursch et al. | 156/184 |
| 4,946,732 | 8/1990 | Cohen et al. | 428/192 |
| 4,966,425 | 10/1990 | Dieul | 350/1.7 |
| 5,104,701 | 4/1992 | Cohen et al. | 428/34.5 |
| 5,463,187 | 10/1995 | Battle | 174/88 R |

FOREIGN PATENT DOCUMENTS

| | | |
|---|---|---|
| 2904141 | 8/1980 | Germany . |
| 1950485 | 8/1995 | Germany . |
| 4424804 | 8/1995 | Germany . |
| WO 92/08924 | 5/1992 | WIPO . |

*Primary Examiner*—James Hook
*Attorney, Agent, or Firm*—Synnestvedt & Lechner LLP

[57] ABSTRACT

A convoluted flexible protective sleeve comprises a wall made of heat-resistant plastics material and a layer of infra-red radiation-reflecting metal vacuum deposited on the outer surface of said wall. The layer is between 0.05 and 5 micrometers in thickness.

8 Claims, 1 Drawing Sheet

CONVOLUTED PROTECTIVE HOSE

This invention is concerned with convoluted flexible protective sleeves which are suitable for use for protecting wires or pipes, eg in the engine compartment of a vehicle. The invention is also concerned with methods of manufacturing such sleeves.

By the term "convoluted flexible protective sleeve", we mean a tube which is adapted to receive flexible wires or pipes and which has a wall of substantially uniform thickness along the length of the tube, the wall being formed into convolutions to make the tube more conformable to bends. The convolutions in such a sleeve can take various forms, eg a cross-section taken through the wall longitudinally of the tube may have the appearance of approximations to sine waves or square waves. Bends in the sleeve are accommodated by opening of the convolutions on the outer side of the bend and closing of the convolutions on the inner side of the bend. Such a sleeve may have a longitudinal slit in its wall to enable the sleeve to be installed over a pipe or wire which is already in situ. Such sleeves are made of heat-resistant plastics material such as nylon 6 or polythene. Such sleeves are used in engine compartments to protect, eg the wiring loom or fuel pipes.

Convoluted flexible protective sleeves act to protect wires and pipes from heat by providing a barrier between the wire or pipe and heat sources and also by creating an insulating layer of air around the wire or pipe. However, it is found that, in many cases, undesirable amounts of heat still reach the wire or pipe.

It is known to reduce the heat which reaches a wire or a pipe protected by a convoluted flexible protective sleeve by wrapping an aluminised tape around the sleeve, the tape forming a spiral extending along the sleeve. Such a tape reflects away infra-red radiation. However, such a tape is time-consuming to install and seriously reduces the flexibility of the sleeve. Furthermore, the tape cannot always be made to conform to the outer surface of the wall of the sleeve, this being particularly difficult in the case of a square wave form.

It is an object of the present invention to provide an improved convoluted flexible protective sleeve which reduces the heat reaching a wire or pipe protected by the sleeve without having the above-described disadvantages of the use of tape.

The invention provides a convoluted flexible protective sleeve comprising a wall made of heat-resistant plastics material, characterised in that the sleeve also comprises a layer of infra-red radiation-reflecting metal vacuum deposited on the outer surface of said wall, the layer of metal being between 0.05 and 5 micrometres in thickness.

In the sleeve according to the invention, the layer of metal reflects away infra-red radiation, thereby reducing the heat reaching the wire or pipe. Furthermore, the thin metal layer does not significantly reduce the flexibility of the sleeve and conforms to the outer surface of the wall of the sleeve.

The vacuum deposition may be a flash evaporation process which results in a substantially continuous and uniform in thickness layer of metal. Sputtering is also a possibility. The layer of metal may be 0.1 to 5 micrometers in thickness.

Since the layer of metal should be as thin as possible, consistent with the layer being durable and continuous, in order to maintain the maximum flexibility, the layer of metal is, preferably, less than 3 micrometres in thickness, more preferably less than 1 micrometre.

The wall may be made of any suitable plastics material such as nylon 6 or polythene. The wall may be made by any of the usual methods.

The sleeve may also comprise a coating comprising an adhesion-promoting material, positioned between the wall and the layer of metal, which coating fills small holes in the surface so that the layer of metal deposited thereon has a smoother outer surface which gives improved reflection. The coating also assists adhesion of the metal. This coating may be applied by spraying, dipping or by vacuum deposition. In the case of vacuum deposition, this coating is suitably applied immediately before the deposition of the layer of metal in the same vacuum chamber in which the metal layer is deposited. A suitable adhesion-promoting material is silicon monoxide.

While the metal forming the layer may be any suitable infra-red radiation-reflecting metal such as stainless steel or nickel-chromium, aluminium and its alloys is preferred because of its good reflecting properties and low risk of corrosion. Nearly pure aluminium (99% pure) may be used.

In order to preserve the infra-red radiation-reflecting properties of the layer of metal, the sleeve may also comprise a coating of a lacquer material covering the outer surface of the layer of metal. The lacquer material serves to separate the metal from the atmosphere and, thus, to inhibit reactions which reduce said reflecting properties. For example, the lacquer material prevents oxidation of the metal which is particularly useful in the case of aluminium. The lacquer material is, preferably, vacuum deposited immediately after the layer of metal is deposited, preferably in the same vacuum chamber so that the metal is allowed no contact with the air. The lacquer material may also be applied by spraying or dipping. Silicon monoxide is a suitable lacquer material.

A sleeve according to the invention may have any suitable form of convolutions, eg an approximately square wave form.

The invention also provides a method of manufacturing a convoluted flexible protective sleeve, characterised in that the method comprises vacuum depositing a layer of infra-red radiation-reflecting metal on the outer surface of a wall made of heat-resistant plastics material so that the layer is between 0.05 and 5 micrometres in thickness.

Preferably, in a method according to the invention, the layer of metal is 0.1 to 5 micrometers in thickness.

In a method according to the invention, the vacuum deposition may be carried out in a vacuum chamber and may be followed, without admitting air into the chamber, by vacuum deposition of a coating of lacquer material covering the outer surface of the layer of metal.

There now follows a detailed description, to be read with reference to the accompanying drawing, of a convoluted flexible protective sleeve which is illustrative of the invention. Also described is a method of manufacturing the illustrative sleeve, this method being illustrative of the invention in its method aspects.

Figure 1:
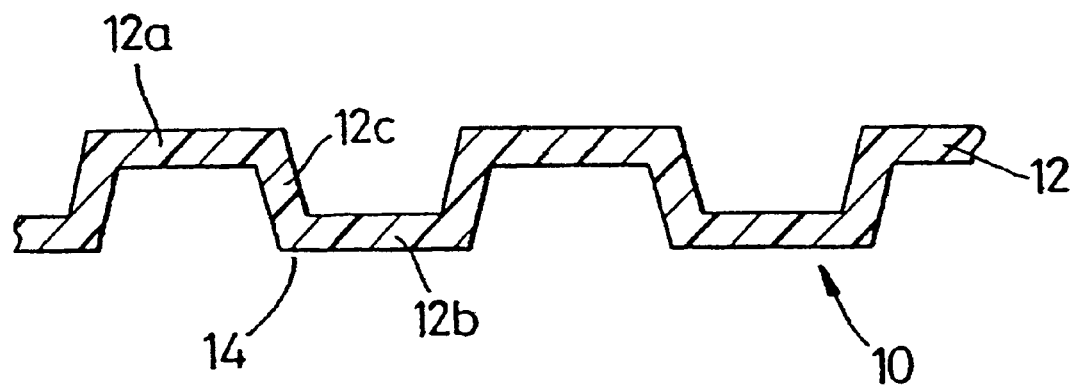
FIG. 1 is a longitudinal cross-sectional view, on an enlarged scale, taken through the illustrative sleeve and FIG. 2 incorporates a magnified view of a portion of the surface of the sleeve.

The illustrative sleeve 10 in FIG. 1 comprises a wall 12 made of heat-resistant plastics material, specifically nylon 6. The wall 12 has a thickness of 0.3 to 0.5 mm and forms a convoluted tube (the drawing shows a short section of one side of this tube). The convolutions of the wall 12 are approximately in the form of a square wave with flat crests 12a which are 2.5 to 2.7 mm in length, flat trough bottoms 12b which are 1.7 to 2 mm in length, inclined trough sides 12c extending between adjacent crests and troughs 12a and 12b. The sides 12c extend radially for 1 to 1.5 mm. Thus, the wall 12 encloses a space 14 which is a circular transverse cross-section at all points along the sleeve 10 but varies in radius. The radius of the space 14 is constant at the crests 12a and greater than at the troughs 12b where it is also constant. The sleeve 10 is intended to protect a wire or pipe (not shown) which passes through the space 14.

Figure 2:
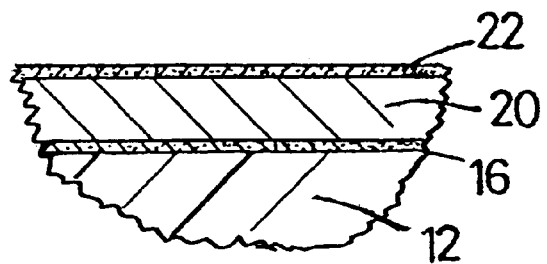

The sleeve 10 also comprises a coating 16 (only shown in FIG. 2) on the outer surface of the wall 12. The coating 16 is of adhesion-promoting material, specifically silicon monoxide. The coating is formed by spraying and is 0.1 micrometres in thickness.

The sleeve 10 also comprises a layer 20 (only shown in FIG. 2) of infra-red radiation-reflecting metal vacuum deposited on the outer surface of said wall 12 on top of the coating 16. The coating 16 is, thus, positioned between the wall 12 and the layer 20. The layer 20 is made of aluminium and is 0.7 micrometres in thickness. The layer 20 is formed by positioning the wall 12 with the coating thereon in a vacuum chamber and flash evaporating the aluminium on to the wall 12 on top of the coating 16.

The sleeve 10 also comprises a coating 22 of a lacquer material, specifically silicon monoxide, covering the outer surface of the layer 20. The coating 22 is approximately 0.1 micrometres in thickness and is formed in the vacuum chamber by flash evaporation of a plasma of polymerised silicon monoxide. The coating 22 is formed immediately after the formation of the layer 20 without allowing air to enter the chamber. The coating 22 prevents oxidation of the aluminium in the layer 20 so that the layer 20 retains a shiny outer surface which efficiently reflects infra-red radiation. The coating 22 is substantially transparent to infra-red radiation.

The sleeve 10 is flexible and is found to be significantly more efficient at protecting wires and pipes from heat than conventional sleeves.

The illustrative method of manufacturing the convoluted flexible protective sleeve 10, thus, comprises vacuum depositing by flash evaporation the layer 20 of infra-red radiation-reflecting aluminium on the outer surface of the wall 12. The illustrative method also involves the deposition by flash evaporation, in the same vacuum chamber, of the coating 22 after the layer 20 without admitting air into the chamber.

The illustrative sleeve 10 was subjected to a standard test in which a heater at 350° C. was positioned 2.5 cm from the sleeve 10 and the temperature at the outer surface of the sleeve and in the middle of the space 14 was measured. A temperature difference of 59° C. (113–54) was noted. The test was repeated using a sleeve without the layer 20 (and also without the coatings 16 and 22) and a temperature difference of 41° C. (113–72) was noted.

What is claimed is:

1. A convoluted flexible protective sleeving comprising a tubular wall, said tubular wall being non-compliant and being comprised of a heat-resistant plastics material, the tubular wall being convoluted and of substantially uniform thickness along its length, the convolutions being yieldable to accommodate bending of the sleeve by opening on the outer side of a bend and closing on the inner side of a bend, thereby making said sleeve more conformable to bends, wherein the sleeve also comprises a layer of infra-red radiation-reflecting metal vacuum deposited on the outer surface of said wall, the layer of metal being between 0.05 and about 1 micrometres in thickness.

2. A sleeve according to claim 1, wherein the layer of metal is at least 0.1 micrometres in thickness.

3. A sleeve according to claim 1, wherein the sleeve also comprises a coating of an adhesion-promoting material, positioned between the wall and the layer of metal.

4. A sleeve according to claim 1, wherein the layer of metal is made of aluminium or an alloy thereof.

5. A sleeve according to claim 1, wherein the sleeve also comprises a coating of lacquer material covering the outer surface of the layer of metal.

6. A method of manufacturing a convoluted flexible protective sleeve comprising a tubular wall, said tubular wall being non-compliant and being comprised of a heat-resistant plastics material, the tubular wall being convoluted and of substantially uniform thickness along its length, the convolutions being yieldable to accommodate bending of the sleeve by opening on the outer side of a bend and closing on the inner side of a bend, thereby making said sleeve more conformable to bends, wherein the method comprises vacuum depositing a layer of infra-red radiation-reflecting metal on the outer surface of wall made of heat-resistant plastics material so that the layer is between 0.05 and 1 micrometres in thickness.

7. A method according to claim 6, wherein the layer of metal is at least 0.1 micrometres in thickness.

8. A method according to claim 6, wherein the vacuum deposition is carried out in a vacuum chamber and is followed, without-admitting air into the chamber, by vacuum deposition of a coating of lacquer material having a thickness of about 0.1 micrometers covering the outer surface of the layer of metal.

\* \* \* \* \*